(12) United States Patent
Ma et al.

(10) Patent No.: US 11,396,171 B2
(45) Date of Patent: *Jul. 26, 2022

(54) HIGH PRESSURE DECORATIVE LAMINATE HAVING A TOP LAYER OF ENERGY CURED ACRYLATED URETHANE POLYMER

(71) Applicant: WILSONART LLC, Austin, TX (US)

(72) Inventors: Muyuan M Ma, Austin, TX (US); Rajesh Ramamurthy, Temple, TX (US); Mahesh Subramanian, Centerville, OH (US)

(73) Assignee: WILSONART LLC, Austin, TX (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/818,522

(22) Filed: Mar. 13, 2020

(65) Prior Publication Data

US 2020/0290332 A1 Sep. 17, 2020

Related U.S. Application Data

(60) Provisional application No. 62/819,181, filed on Mar. 15, 2019.

(51) Int. Cl.
| | |
|---|---|
| *B32B 29/06* | (2006.01) |
| *D21H 27/26* | (2006.01) |
| *D21H 19/24* | (2006.01) |
| *D21H 25/06* | (2006.01) |
| *B32B 29/00* | (2006.01) |

(52) U.S. Cl.
CPC ............ *B32B 29/06* (2013.01); *B32B 29/005* (2013.01); *D21H 19/24* (2013.01); *D21H 25/06* (2013.01); *D21H 27/26* (2013.01); *B32B 2250/26* (2013.01); *B32B 2255/12* (2013.01); *B32B 2255/26* (2013.01); *B32B 2260/028* (2013.01); *B32B 2260/046* (2013.01); *B32B 2310/0831* (2013.01); *B32B 2451/00* (2013.01)

(58) Field of Classification Search
CPC ... B32B 29/06; B32B 29/005; B32B 2250/26; B32B 2255/12; B32B 2255/26; B32B 2260/028; B32B 2260/046; B32B 2310/0831; B32B 2451/00; B32B 29/002; D21H 19/24; D21H 25/06; D21H 27/26
See application file for complete search history.

(56) References Cited

U.S. PATENT DOCUMENTS

| | | | |
|---|---|---|---|
| 11,020,948 B2* | 6/2021 | Krebs | ................... B32B 29/005 |
| 2002/0136862 A1 | 9/2002 | Dong et al. | |
| 2018/0050527 A1* | 2/2018 | Ma | ............................ B32B 7/06 |
| 2019/0077138 A1 | 3/2019 | Ma et al. | |
| 2019/0091983 A1 | 3/2019 | Krebs | |

* cited by examiner

*Primary Examiner* — Catherine A. Simone
(74) *Attorney, Agent, or Firm* — Welsh Flaxman & Gitler LLC

(57) ABSTRACT

A laminate lay-up includes a coated decorative paper layer having a decorative paper layer with a textured coating layer applied thereto. The textured coating layer is comprised of a UV curable coating composition. The laminate lay-up also includes a decorative layer and a core layer.

10 Claims, 6 Drawing Sheets

HIGH PRESSURE DECORATIVE LAMINATE HAVING A TOP LAYER OF ENERGY CURED ACRYLATED URETHANE POLYMER

CROSS REFERENCE TO RELATED APPLICATION

This application claims the benefit of U.S. Provisional Patent Application Ser. No. 62/819,181, entitled "HIGH PRESSURE DECORATIVE LAMINATE HAVING A TOP LAYER OF ENERGY CURED ACRYLATED URETHANE POLYMER," filed Mar. 15, 2019.

BACKGROUND OF THE INVENTION

1. Field of the Invention

The invention relates to decorative laminates. More particularly, the invention relates to high pressure decorative laminates having a top layer of energy cured acrylated urethane polymer.

2. Description of the Related Art

High pressure decorative laminates are currently manufactured with smooth glossy surfaces, textured surfaces, or deeply sculpted and embossed surfaces. As general background, decorative laminates prepared by heat and pressure consolidation have been produced commercially for a number of years, and have found widespread acceptance in the building and furniture industry as countertop and tabletops, bathroom and kitchen work surfaces, wall paneling, flooring products, partitions and doors. These decorative laminates may be described as containing a number of laminae consolidated to form a unitary structure carrying a surface decoration. The surface decoration may range from something as simple as a solid color to something as complex as an embossed simulated wood grain finish.

Decorative laminates generally include plural layers of synthetic resin impregnated paper sheets bonded under heat and pressure to form a unitary structure. In normal practice, a decorative laminate sheet assembly, from the bottom up, includes a core of one or more phenolic resin impregnated sheets, above which lies a decorative melamine-formaldehyde impregnated sheet. The decorative sheet may be further covered with a melamine-formaldehyde impregnated overlay. The core, or base, functions to impart rigidity to the decorative laminate and usually includes a solid substrate which may, or may not, be formed prior to the initial laminating steps. Prior to stacking, the sheets of the core member are impregnated with a water alcohol solution of phenol formaldehyde, dried and partially cured in a hot oven, and finally cut into shapes.

The core may, for example, include a plurality of sheets of 90-150 pound phenolic resin impregnated Kraft paper. The Kraft paper is impregnated throughout and bonded with a substantially completely cured phenolic resin which has been converted to a thermoset state during the initial laminating step. The substrate may be a pre-cured plastic laminate, such as glass fiber-reinforced thermoset polyester resin laminates and the like, a wood product, such as hardboard, wood waste or particle boards, plywood and the like, a mineral base board, such as, cement-asbestos board, sheet rock, plaster board, and the like, or a combination of substrates.

The decorative sheet provides the decorative laminate with an attractive appearance. The decorative sheet also dictates the surface characteristics of the decorative laminate. For example, the composition of the decorative sheet dictates the decorative laminate's resistance to chemical agents, heat, light, shock and abrasion. Decorative sheets are commonly manufactured from high quality 50-125 pounds per 3,000 square ft. ream basis weight (80-202 grams per square meter), pigment filled, alpha-cellulose paper impregnated with a water alcohol solution of melamine-formaldehyde resin. The resin impregnated decorative sheets are subsequently dried, partially cured, and finally cut into sheets. The pigment filled, alpha-cellulose paper of the decorative sheet, may include a solid color, a decorative design, or a roto-gravure reproduction of natural materials, such as, wood, marble, leather, etc. The aesthetic characteristics of the cellulose paper are revealed as the laminate's decorative design upon completion of the decorative laminate.

Decorative laminates are generally manufactured by placing the resin impregnated core and decorative sheet between steel plates and subjecting the decorative laminate stack to heat and pressure for a time sufficient to consolidate the laminate and cure the resins (generally about 25 minutes to an hour). The pressure and heat force the resin in the paper sheets to flow, cure, and consolidate the sheets into a unitary laminated mass referred to in the art as a decorative high pressure laminate. Finally, the formed decorative laminate is bonded to a reinforcing substrate, such as, plywood, hardboard, asbestos board, particle board or the like.

Generally, more than one laminate is formed at one time. Multiple laminates are formed by inserting a plurality of decorative laminate sheet assemblies into a stack. Release sheets are positioned between the decorative laminate sheet assemblies to separate the various laminates stacked together. After consolidation, the release sheets allow the individual laminates to be separated.

Textured decorative laminates are also very popular. The textured surfaces range from relatively shallow depressions, such as, textured (e.g., satin, matte or semi-gloss) surfaces, to relatively deeply sculpted or embossed surfaces having a noticeable three-dimensional effect, such as, wood grain, leather, slate, abstract patterns, creative designs etc. The textured laminates are commonly manufactured using release sheets with the desired surface texture, which surface texture is imparted to the decorative laminate during the application of heat and pressure in the manufacturing process.

It has, however, been found that high pressure decorative laminates are susceptible to a build-up of fingerprints as the surface of the high pressure decorative laminate is touched during the course of the day. The fingerprints remain visible and can become highly distracting. Prior attempts to address this problem have relied upon chemically modified surfaces to achieve the purpose. However, such attempts have only led to limited success. As such, a need remains for a high pressure decorative laminate that is not susceptible to the build-up of fingerprints on the surface thereof.

SUMMARY OF THE INVENTION

According to a first aspect there may be provided a laminate lay-up including a coated decorative paper layer having a decorative paper layer with a textured coating layer applied thereto. The textured coating layer is comprised of a UV curable coating composition. The laminate lay-up also includes a decorative layer and a core layer.

In some embodiments the UV curable coating composition is an energy cured acrylated urethane polymer.

In some embodiments the energy cured acrylated urethane polymer includes acrylate and acrylated urethane oligomers, before final polymerization.

In some embodiments the decorative paper layer is an untreated decorative paper layer.

In some embodiments the laminate lay-up includes a low basis weight paper that has been impregnated with melamine-formaldehyde resin positioned beneath the coated decorative paper layer.

In a further aspect there may be provided a decorative laminate manufactured by the method comprising applying a UV curable coating composition to a decorative paper layer, irradiating the UV curable coating composition with LED precure by excimer UV to create a UV-irradiated layer having a surface exhibiting micro-folding, partially curing the UV-irradiated layer to form a UV cured coating on the decorative paper layer, forming a laminate lay-up including the decorative paper layer with the UV cured coating, and applying heat and pressure to consolidate the laminate lay-up and form the decorative laminate.

In some embodiments the step of irradiating is includes treating the UV curable coating composition so that the UV curable coating composition is only crosslinked on a surface thereof to produce a supermatting surface through micro-convolution.

In some embodiments the step of irradiating is achieved with an excimer emitter based on a Xe-emission spectrum at a wavelength of 172 nm in a presence of nitrogen.

In some embodiments the step of partially curing is achieved by E-beam or UV irradiation.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
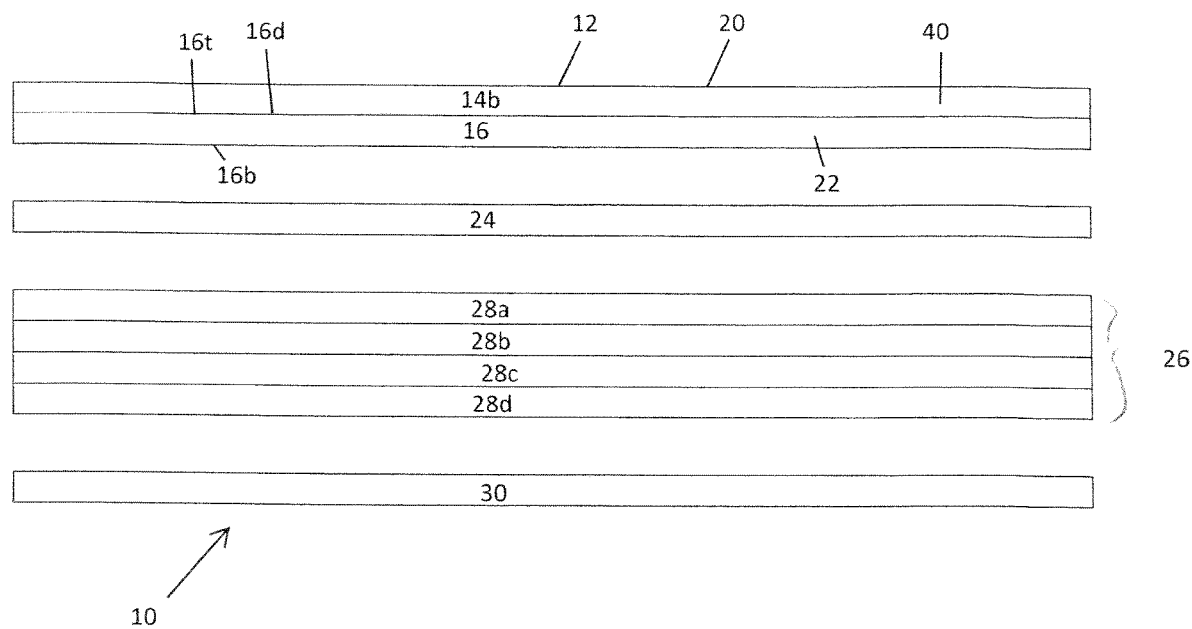
FIG. 1 is a schematic of a laminate lay-up in accordance with the present invention.

With reference to FIG. 1, a decorative laminate lay-up in accordance with the present invention is disclosed. The laminate lay-up 10 includes a top layer 12 of a textured coating layer 14b, in particular, an energy cured acrylated urethane polymer having a chemical composition mainly composed of acrylate and acrylated urethane oligomers (before final polymerization). The textured coating layer 14b is coated directly onto an untreated decorative paper layer 16, resulting in a coated decorative paper layer 18 having an upper surface 20 (that is, the exposed top layer 12 of the textured coating layer 14b) and a lower surface 20 (that is, the surface of the low decorative paper layer 16 opposite the exposed top layer, and that is bonded to low basis weight paper layer 24).

Figure 2:
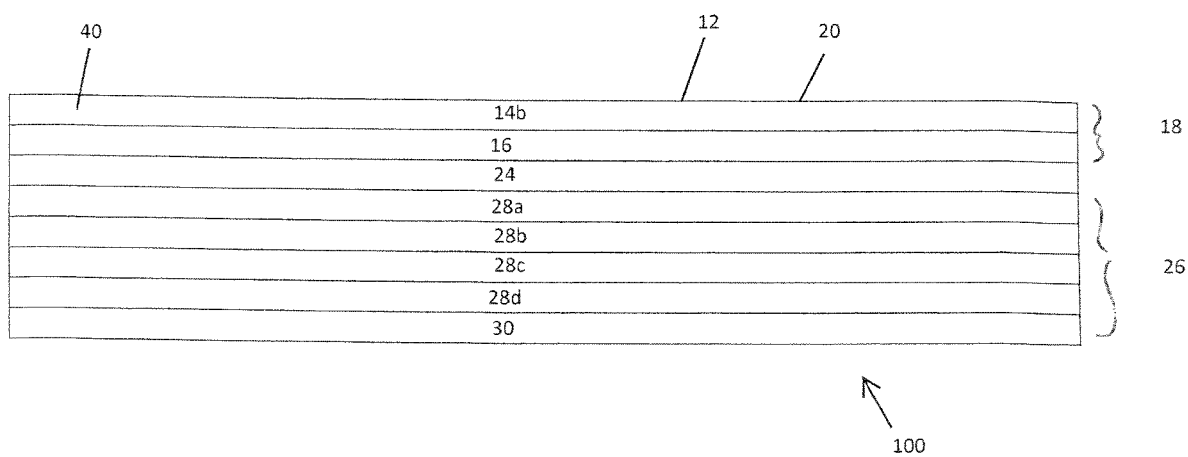
FIG. 2 is a schematic of a decorative laminate in accordance with the present invention.

Positioned beneath the coated decorative paper layer 18, the laminate lay-up 10 also includes a low basis weight paper 24, for example, an overlay type paper, defining a low basis weight paper layer, that has been impregnated with melamine-formaldehyde resin, a core layer 26 composed of one or more sheets of Kraft paper impregnated with phenol-formaldehyde resin 28a-d, and a bottom layer 30 composed of a material allowing for ready release of laminates consolidated together. The decorative laminate lay-up 10 is ultimately subjected to heat and pressure as described below to form a high pressure decorative laminate 100 (see FIG. 2) in accordance with the present invention.

The decorative laminate lay-up 10 is assembled by stacking the coated decorative paper layer 18 (that is, decorative paper layer 16 coated with the textured coating layer 14b), the low basis weight paper layer 24, the core layer 26, and the bottom layer 30. The sheets used in the production of the high pressure decorative laminate 100 (see FIG. 2) in accordance with the present invention are stacked in preparation for the heating and pressure steps used to consolidate the high pressure decorative laminate 100.

While a specific layering pattern is disclosed in accordance with a preferred embodiment of the present invention, the layering pattern may be varied, somewhat, without departing from the spirit of the present invention. For example, it is possible to replace the low basis weight paper layer with a Kraft paper that contains melamine-formaldehyde resin on the side next to the lower surface of the coated decorative paper layer and phenolic resin on the other side. This two-side coating is preferably achieved using the two-sided coating technology of Wilsonart LLC as disclosed in U.S. Pat. No. 6,610,358 to Williams, entitled "SYSTEM AND METHOD FOR TWO SIDED SHEET TREATMENT," which is incorporated herein by reference.

Figure 3:
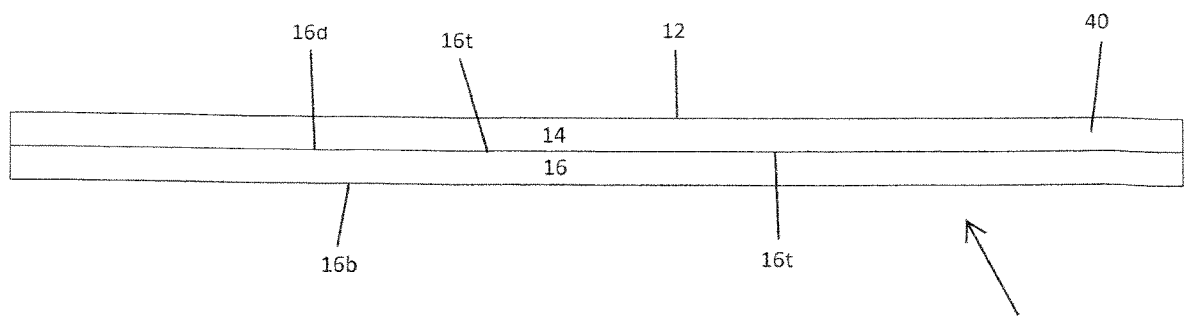
FIGS. 3, 4 and 5 are schematics showing the formation of the UV cured coating layer and the decorative paper layer.
Figure 4:
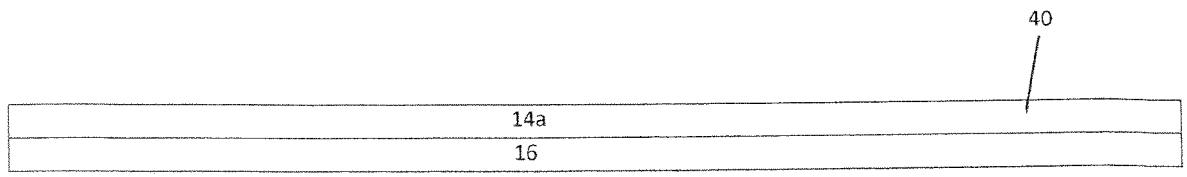
Figure 5:
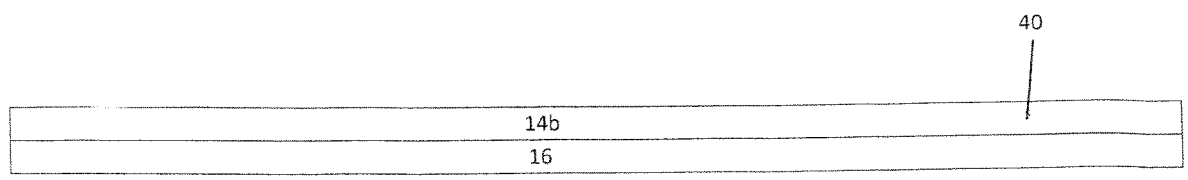

Referring to FIGS. 3, 4, and 5, the decorative paper layer 16 in accordance with the present invention is selected from a wide array of sheets commonly used as decorative sheets in the industry. For example, the decorative paper layer 16 may be a solid color (for example, white) or include an aesthetically appealing pattern. As discussed above, the decorative paper layer 16 provides the high pressure decorative laminate with an attractive appearance. The top layer 12 of the textured coating layer 14b, in combination with the decorative paper layer 16, dictate the surface characteristics of the final decorative laminate 100. For example, the composition of the textured coating layer 14b and the decorative paper layer 12 help to dictate the decorative laminate's resistance to chemical agents, heat, light, shock and abrasion.

In accordance with the present invention, the decorative paper layer 16 is composed of a sheet of decorative paper commonly manufactured from high quality pigment filled, alpha cellulose paper having a basis weight of approximately 50 grams per square meter to 200 grams per square meter, preferably 50 grams per square meter to 120 grams per square meter, and more preferably 80 grams per square meter. In contrast with conventional decorative paper layers used in the manufacture of the high pressure decorative laminates, the decorative paper layer of the present invention is untreated (with the exception of the application of the top layer of the textured coating layer 14b composed of the UV (ultraviolet) curable coating composition described below in greater detail). The pigment filled, alpha cellulose paper of the decorative paper layer 16, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate 100. While in accordance with a disclosed embodiment, the decorative paper layer is composed of an untreated decorative paper, it is appreciated a resin impregnated decorative paper layer may be used without departing from the spirit of the present invention.

As mentioned above, the top layer 12 of a textured coating layer 14b is applied directly to the top surface 16t of the decorative paper layer 16 so as to form the coated decorative paper layer 18. As will be explained below in greater detail, the application of the textured coating layer 14b to the top surface 16t of the decorative paper layer 16 is conducted prior to stacking the various layers of the laminate lay-up.

The textured coating layer 14b is composed of a UV curable coating composition 14 composed of the following formulation:
 60% to 90%, by weight, urethane acrylate;
 8% to 38%, by weight, reactive diluent, such as, isobornyl acrylate;
 1.0% to 10%, by weight, photo initiator, for example, a combination of 0.5% to 5% by weight benzophenone and 0.5% to 5% by weight triethanol amine; and
 0.5% to 5%, by weight, a thermal initiator, for example, tert-Butyl peroxybenzoate.

In accordance with a preferred embodiment, the UV curable acrylate mixture has the following composition (when electron beam is used to complete the final curing, no photoinitiators will be used in the formulation):

| | |
|---|---|
| 42% | Ebecryl ® 294/HD 25 (an aliphatic urethane triacrylate oligomer diluted with 1,6-hexanediol diacrylate (HDDA)(1) monomer.). |
| 38% | Ebecryl ® 5129 (a hexafunctional aliphatic urethane acrylate oligomer which provides fast cure response when exposed to ultraviolet light or electron beam.). |
| 9% | Ebecryl ® 8209 (a Sn-free aliphatic urethane acrylate oligomer which provides extremely fast cure response when exposed to ultraviolet (UV) light or electron beam (EB).). |
| 5% | HDDA/TMPTA (Hexanediol diacrylate (HDDA) is a difunctional reactive diluent that is commonly used as a component of ultraviolet light (UV) and electron beam (EB) curable coatings and inks. Trimethylolpropane triacrylate (TMPTA) is a trifunctional monomer used for its low volatility and fast cure response.) |
| 2% | Photoinitiator |
| 2% | Cerafak 127N (a Fischer Tropsch wax dispersion. Provides improved water repellence properties.). |
| 1% | TBPB (tert-Butyl peroxybenzoate (TBPB) a chemical compound from the group of peresters which functions as a radical initiator in a polymerization process, that is, a thermal initiator). |
| 1% | Modaflow 9200 (an acrylic flow modifier, without silicone addition. It improves flow and leveling, substrate wetting, or maintains high gloss and substrate and inter-coat adhesion, and facilitates pigment dispersion). |

The UV curable coating composition 14 is designed for a multi-step curing process. Once the decorative paper layer 16 is prepared and ready for use, the UV curable coating composition 14 (which is ultimately cured to form the coating layer) is applied upon the decorative paper layer 16 and is irradiated with LED (light emitting diode) precure by excimer UV to a create a UV-irradiated layer 14a having a surface exhibiting micro-folding. In particular, the irradiation is applied so that UV curable coating composition 14 is neither hardened nor is the entire layer of UV curable coating composition 14 crosslinked. Rather the UV cured acrylate mixture is only crosslinked on the surface thereof, which produces a supermatting surface through the effects of a micro-convolution. In accordance with a preferred embodiment, the UV-radiation irradiates via an excimer emitter based on a Xe-emission spectrum at a wavelength of 172 nm in the presence of nitrogen.

The UV-irradiated layer 14a is then partially cured by E-beam (electron beam) or UV irradiation (i.e. 200-400 nm). In particular, the UV-irradiated layer 14a partially cured by excimer is then subjected to an electron beam irradiation to crosslink and harden the entire layer and form the final textured coating layer 14b of the coated decorative paper layer 18. As will be explained below, the UV curable coating composition 14 of the textured coating layer 14b is fully and finally cured as a result of the heat applied during the application of heat and pressure during the consolidation process associated with the formation of the decorative laminate.

During the compression molding process, the laminate lay-up 10 is stacked in a known manner and placed between stainless steel plates. The laminate lay-up 10 or "sandwich" is then placed between heated platens. The platens are closed to press the laminate lay-up 10 with approximately 1400 psi (or 100 bar) of pressure. During the heating and pressure molding process the melamine-formaldehyde of the low basis weight paper layer 24, which is positioned directly below coated decorative paper layer 18, liquefies, flows, and cures into a thermoset polymer. During the flow phase some of the melamine-formaldehyde resin diffuses into the coated decorative paper layer 18. This ensures that consolidation between the coated decorative paper layer 18, the low basis weight paper layer 24, the core layer 26, and the bottom layer 30 is completed. During the pressing under heat, the phenol-formaldehyde of the core layer 26 also liquefies, flows, and cures into a thermoset polymer, like a normal high pressure decorative laminate product. Some of the phenol-formaldehyde liquid resin mixes with the melamine-formaldehyde resin of the low basis weight paper layer 24 above it, as normally happens during the production of high pressure decorative laminate.

The textured coating layer 14b provides good physical and chemical properties as the top layer 12 in the production of high pressure decorative laminates. UV cured products are characterized as having excellent surface hardness. Additionally, the UV curable coating composition 14 used in accordance with present invention has a fast cure response to UV light exposed to the UV curable coating composition at a rate of 15-20 millijoules per square centimeter. Faster formulations can be prepared using different UV absorbers, dyes, and sensitizing reagents.

In accordance with the present invention, and the consolidating process for the manufacture of decorative laminate 100 in accordance with the present invention, the textured coating layer 14b is coated on the top surface 16t of the decorative paper layer 16 (that is, the decorative sheet) so as to ultimately define the top layer 12 of the laminate lay-up 10 and the resulting high pressure decorative laminate. As discussed above, the decorative paper layer 16 is selected from traditional decorative papers used in the high pressure decorative laminate industry, has a basis weight of approximately 80 grams per square meter, and is not treated or impregnated with melamine-formaldehyde resin.

The UV curable coating composition 14 is applied to the decorative side 16d of the decorative paper layer 16 (that is, the top surface) at a coating weight of 40 to 80 grams per square meter. Most of the radiation and thermally cured composition stays at the top surface of the decorative paper layer 16 but some of the radiation and thermally cured composition penetrates into the decorative paper layer 16. In fact, it is acceptable if the backside (or bottom surface) 16b of the decorative paper layer 16 appears "wet" or changes color like one would expect if that bottom surface had some coating applied to it.

After the UV curable coating composition 14 is applied to the decorative paper layer 16, it is cured via the two-stage process described above.

Improved wear resistance may be achieved by incorporating aluminum oxide 40 into the UV curable coating composition 14. In particular, and regardless of whether the former or latter embodiment of the formulation is used, 100 grams of the formulation is added 3%, by weight, aluminum oxide (preferably, in powder form). In accordance with a preferred embodiment, the aluminum oxide 40 is 12S from the Micro Abrasives Corporation of Westfield, Mass. 01086 USA. The aluminum oxide 40 is mixed into the UV curable coating composition 14. The aluminum oxide 40 is easily dispersed into the UV curable coating composition 14 using known techniques. Due to the high viscosity of the UV curable coating composition 14, the aluminum oxide 40 settles very slowly, and a working life of one hour is easily achieved before additional mixing is required. Additionally, the small particles of aluminum oxide 40 do not cause noticeable wear to gravure coating cylinders or Meyer rods used for controlling coat weights over a several hour coating run or trial. It was found that at 3%, by weight, addition level for the aluminum oxide 40 the scuff resistance was maximized while maintaining excellent clarity. While the aluminum oxide is mixed into the UV curable coating composition prior to application to the decorative paper layer, it is appreciated the aluminum oxide may be spread upon the UV curable coating composition after the UV curable coating composition is applied to the decorative paper layer.

The coated decorative paper layer 18 is then ready to become the top layer of the decorative laminate 100.

The low basis weight paper layer 24 is preferably a melamine-formaldehyde impregnated paper layer. In accordance with a preferred embodiment, the low basis weight paper layer 24 is composed of paper having a basis weight of 18 grams per square meter to 40 grams per square meter, preferably 18 grams per square meter to 25 grams per square meter. It is impregnated with melamine-formaldehyde resin to give a low basis weight paper layer that is 60% to 85% resin content after appropriate drying to remove the solvent from the melamine-formaldehyde resin.

The core layer 26 is preferably composed of one or more phenolic resin impregnated sheets 28a-d, although other materials may be used without departing from the spirit of the present invention. For example, the core layer 26 includes sheets of 120 grams per square meter to 500 grams per square meter dry phenolic resin impregnated Kraft paper, which has been impregnated with a phenolic resin content of approximately 30+/-5%. The Kraft paper is impregnated throughout and bonded with a substantially cured phenolic resin which has been converted to a thermoset state during the initial laminating step.

The bottom layer 30 is preferably a parchment treated sheet of Kraft paper impregnated with a phenolic formaldehyde resin as disclosed in U.S. Pat. No. 9,079,452, entitled "Decorative Laminate and Method for Manufacturing Same," which is incorporated herein. However, and as discussed above, the bottom layer may take other forms without departing from the spirit of the present invention. For example, the bottom layer could be a dual coated sheet of Kraft paper treated in the manner disclosed in U.S. Pat. No. 6,610,358 to Williams, entitled "SYSTEM AND METHOD FOR TWO SIDED SHEET TREATMENT," which is incorporated herein by reference.

While a traditional Kraft paper is disclosed above for us in a conjunction with the present invention, it is also contemplated the core may be composed of a plurality of sheets of paper manufactured from pigmented and bleached fibers so that various colors are available (that is, "color core"). In contrast with the previously described core papers, these sheets of paper are impregnated with melamine-formaldehyde resin. Because phenolic resin is red to brown in color, and is not light stable, it undesirably darkens slowly when exposed to ambient lighting. Melamine-formaldehyde resin does not appreciable change the color of the core paper and melamine-formaldehyde resin is light stable. As a result, it does not darken with time and exposure to light. By making the change to "color core" the dark line between the core and the decorative sheet associated with most high pressure laminate products is eliminated.

In accordance with a preferred embodiment, the basis weight of the paper sheets used in this "color core" embodiment is 210 grams per square meter. The paper is impregnated with normal high pressure laminate type melamine-formaldehyde resin to a resin content of 32-34%, and more preferably 32+/-0.5%. Multiply sheets of the "color core" paper are used to produce a product with a specific thickness. Generally, 3 or 4 sheets of "color core" paper are used.

The colors used in the sheets making up the core are chosen to match the overall color of the decorative sheet to the color of the core. For example, if the decorative sheet represented a walnut wood grain pattern the color core would have a dark brown color. If the decorative sheet represented a maple wood the color core would be a light tan or khaki colored.

Figure 6:
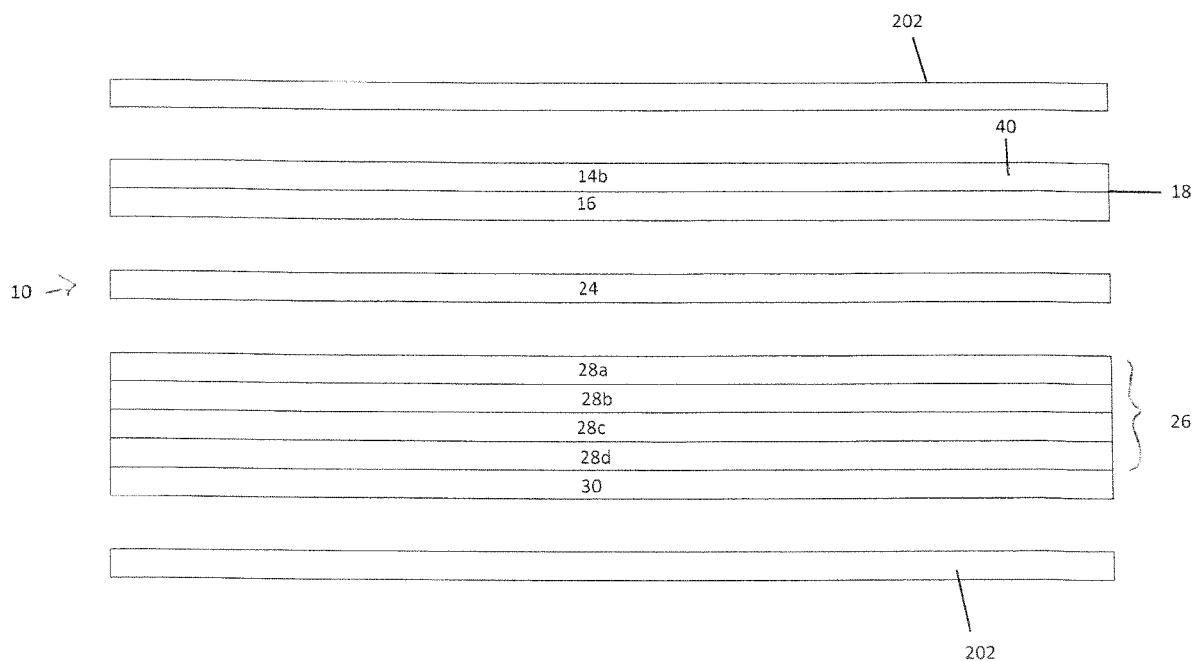
FIG. 6 is a schematic of the laminate lay-up within a platen press.

In accordance with the present invention, and with reference to FIG. 6, the decorative laminate 100 of the present invention is formed in much the same manner as conventional decorative laminates. The layers are first stacked (to form the decorative laminate lay-up 10) and placed between steel plates. The decorative laminate stack is then subjected to temperatures in the range of 121 degrees Celsius to 160 degrees Celsius and pressure of about 56.24 kilograms per square centimeter to 112.48 kilograms per square centimeter for a time sufficient to consolidate the decorative laminate and cure the resins (generally about 25 minutes to an hour).

The pressure and heat force the resin in the paper sheets to flow, cure and consolidate the sheets into a unitary laminated mass referred to in the art as a decorative high pressure decorative laminate 100. In addition, to causing the resin impregnating the various layers of the laminate lay-up 10 to cure, the heat and pressure fully and finally cure the UV curable coating composition 14 of the textured coating layer 14b. Generally, more than one decorative laminate is formed at one time. Multiple decorative laminates are formed by inserting a plurality of sheets in a stack. Release sheets are positioned between the assembled sheets to separate the various decorative laminates stacked together. Upon pressing between suitable laminate presses plates, the release sheet allows release between the first lay-up and the adjacent lay-up. A platen press assembly, as is well known in the lamination art, provides the necessary heat and/or pressure during lamination. After consolidation, the release sheets allow the individual decorative laminates to be separated.

In accordance with an alternate embodiment, the core layer and the bottom layer may be replaced with particleboard or medium density fiberboard. In accordance with such an embodiment, the decorative paper layer, the low basis weight paper layer, and particleboard/medium density fiberboard would be stacked in that order and thermally fused using heat pressure commonly used in the manufacture of low-pressure melamine panels.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A laminate lay-up, comprising:
a decorative layer comprising a coated decorative paper layer consisting of an untreated decorative paper layer, of alpha cellulose paper having a basis weight of approximately 50 grams per square meter to 200 grams per square meter, and textured coating layer comprised of a UV curable coating composition including an energy cured acrylated urethane polymer applied thereto; and
a core layer.

2. The laminate lay-up according to claim 1, wherein the energy cured acrylated urethane polymer includes acrylate and acrylated urethane oligomers, before final polymerization.

3. The laminate lay-up according to claim 1, further including a low basis weight paper that has been impregnated with melamine-formaldehyde resin positioned beneath the coated decorative paper layer.

4. A decorative laminate manufactured by the method consisting essential of:
applying a UV curable coating composition including an energy cured acrylated urethane polymer to an untreated decorative paper layer of alpha cellulose paper having a basis weight of approximately 50 grams per square meter to 200 grams per square meter;
irradiating the UV curable coating composition with LED precure by excimer UV to create a UV-irradiated layer having a surface exhibiting micro-folding;
partially curing the UV-irradiated layer to form a UV cured coating on the decorative paper layer;
forming a laminate lay-up including the decorative paper layer with the UV cured coating; and
applying heat and pressure to consolidate the laminate lay-up and form the decorative laminate.

5. The decorative laminate according to claim 4, wherein the step of irradiating is includes treating the UV curable coating composition so that the UV curable coating composition is only crosslinked on a surface thereof to produce a supermatting surface through micro-convolution.

6. The decorative laminate according to claim 5, wherein the step of irradiating is achieved with an excimer emitter based on a Xe-emission spectrum at a wavelength of 172 nm in a presence of nitrogen.

7. The laminate lay-up according to claim 6, wherein the energy cured acrylated urethane polymer includes acrylate and acrylated urethane oligomers, before final polymerization.

8. The decorative laminate according to claim 7, wherein the step of partially curing is achieved by E-beam or UV irradiation.

9. The decorative laminate according to claim 4, wherein the step of irradiating is achieved with an excimer emitter based on a Xe-emission spectrum at a wavelength of 172 nm in a presence of nitrogen.

10. The decorative laminate according to claim 4, wherein the step of partially curing is achieved by E-beam or UV irradiation.

* * * * *